(12) United States Patent
Weinmeier et al.

(10) Patent No.: US 7,138,731 B2
(45) Date of Patent: Nov. 21, 2006

(54) SWITCHING CONVERTER HAVING A CONTROLLABLE LOAD ELEMENT

(75) Inventors: Harald Weinmeier, Vienna (AT); Andreas Kranister, Wilhelmsburg (AT); Thomas Rothmayer, Vienna (AT)

(73) Assignee: Siemens AG Osterreich, Vienna (AT)

( * ) Notice: Subject to any disclaimer, the term of this patent is extended or adjusted under 35 U.S.C. 154(b) by 476 days.

(21) Appl. No.: 10/398,152

(22) PCT Filed: Sep. 24, 2001

(86) PCT No.: PCT/AT01/00302

§ 371 (c)(1),
(2), (4) Date: Apr. 2, 2003

(87) PCT Pub. No.: WO02/29961

PCT Pub. Date: Apr. 11, 2002

(65) Prior Publication Data

US 2003/0178890 A1    Sep. 25, 2003

(30) Foreign Application Priority Data

Oct. 2, 2000   (AT) ............................. A 1671/2000

(51) Int. Cl.
*H02J 1/06* (2006.01)
(52) U.S. Cl. ........................... 307/83; 307/140; 363/97
(58) Field of Classification Search ............. 363/21.01, 363/21.04, 21.05, 20, 97; 307/140, 83
See application file for complete search history.

(56) References Cited

U.S. PATENT DOCUMENTS

| | | | | |
|---|---|---|---|---|
| 3,987,342 A | * | 10/1976 | Bird et al. ..................... 307/86 |
| 4,628,429 A | * | 12/1986 | Walker ......................... 363/97 |
| 4,669,036 A | | 5/1987 | Cowett, Jr. | |
| 4,685,020 A | * | 8/1987 | Driscoll et al. ................ 361/18 |
| 4,745,299 A | * | 5/1988 | Eng et al. ................. 363/21.04 |
| 4,902,954 A | * | 2/1990 | Oshima et al. ............. 318/762 |
| 4,926,305 A | | 5/1990 | Brahms et al. | |
| 5,990,633 A | * | 11/1999 | Hirschmann et al. ....... 315/289 |
| 6,005,302 A | | 12/1999 | Borho et al. | |
| 6,088,244 A | * | 7/2000 | Shioya et al. .................. 363/97 |
| 6,178,100 B1 | * | 1/2001 | Kitano ......................... 363/97 |

FOREIGN PATENT DOCUMENTS

DE   197 38 698 A1   3/1999

OTHER PUBLICATIONS

International Search Report of PCT/AT01/00302, dated Apr. 18, 2002.
International Preliminary Examination Report of PCT/AT01/00302, dated Dec. 20, 2002.

* cited by examiner

*Primary Examiner*—Robert L. Deberadinis
*Assistant Examiner*—Andrew Deschere
(74) *Attorney, Agent, or Firm*—Christie, Parker & Hale LLP

(57) ABSTRACT

Switching converter to convert an input direct current ($U_E$) into at least one output direct current ($U_A$), wherein an internal auxiliary voltage ($U_{H1}$, $U_{H2}$) is derived from at least one auxiliary winding ($W_{H1}$, $W_{H2}$) of a transformer (Tr), a controllable load element (BAL) is provided for the output voltage, and a stop signal ($s_s$) can be fed to turn the output voltage of the switching converter ON/OFF, which is used to connect the load element (BAL) to the output direct current to such an extent that a short-circuit-like condition is produced, in which the output voltage ($U_a$) is adequately close to null, but the at least one auxiliary voltage ($U_{H1}$, $U_{H2}$) is adequately high to supply the units associated therewith.

10 Claims, 2 Drawing Sheets

SWITCHING CONVERTER HAVING A CONTROLLABLE LOAD ELEMENT

CROSS-REFERENCE TO RELATED APPLICATION

Figure 1:
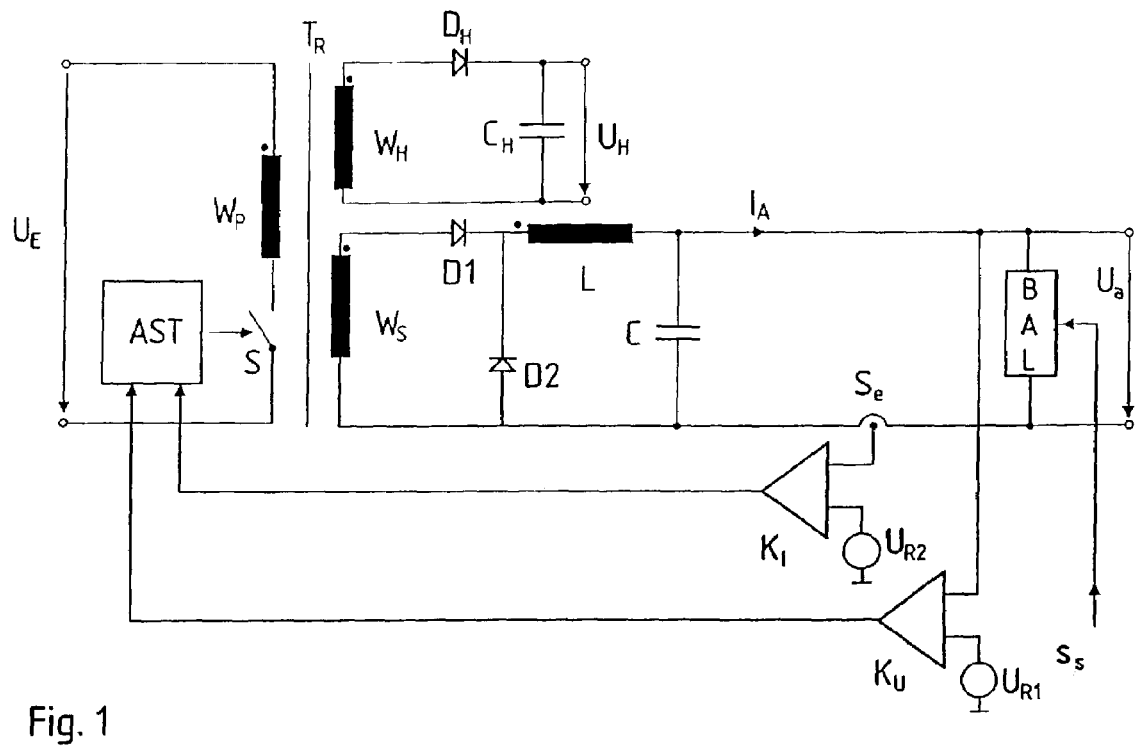

This application is a National Phase Patent Application of International Application No. PCT/AT01/00302, filed on Sep. 24, 2001, which claims priority of Austrian Patent Application Number A 1671/2000, filed Oct. 2, 2000

The invention relates to a switching converter to convert an input direct current into at least one output direct current, wherein a primary winding of a transformer may be connected via a controlled switch to the input direct current, a control signal with a variable pulse duty factor is fed to the switch by a control circuit, and regulation is provided depending on secondary and/or primary currents or voltages by changing at least the pulse duty factor of the control signal, an internal auxiliary voltage is derived from at least one auxiliary winding, a controllable load element is provided for the output voltage, and a stop signal can be fed to turn the output voltage of the switching converter ON/OFF.

Switching converters of this type have become known in a large number of embodiments, either as blocking converters or as flow converters. The control circuit usually includes a pulse width modulator, whose pulse duty factor may be changed for the purpose of regulation, in particular to a constant output voltage or a constant output current.

The turning ON/OFF of such a switching converter should often be possible using a stop signal that can come, for example, from a consuming device and should be at the secondary side potential level. Then, switching may be carried out using a switch of the primary side if potential separation is taken care of by an optical coupler or a relay device. The stop signal may, however, also be generated in the switching converter itself, e.g., upon occurrence of error conditions, such as short circuits, etc.

Aside from the fact that this solution is expensive, all auxiliary voltages that supply the control and regulation circuits with current are also turned off, a situation that is undesirable for various reasons, for example, due to the time that is necessary until the converter reaches a stationary stable state after being turned on again. In such cases, the auxiliary voltage(s) is/are obtained using independent additional converters permanently connected to the main power grid, or it is possible—if a potential separation of the auxiliary voltage from the main power grid is not necessary—to draw an auxiliary voltage directly from the main power grid, e.g., by means of a longitudinal regulator or a capacitive voltage divider.

One object of the invention is to enable de-energizing the converter on the secondary side based on a stop signal without interrupting the power supply of the converter-internal control and regulation units.

This object is accomplished with a switching converter of the type mentioned in the introduction, wherein, according to the invention, the stop signal to connect the load element to the output direct current is used to such an extent that a short-circuit-like condition is produced, in which the output voltage is close enough to null, the at least one auxiliary voltage is adequately high to supply the units associated therewith.

The invention thus uses the behavior of a switching converter that is regulated by pulse width modulation in that a short-circuit-like condition is produced, whereby the pulse duty factor becomes small, but remains on an auxiliary winding for enough voltage that the associated auxiliary voltage can supply the regulation/control units of the converter. The output voltage remaining on the load element can be kept so slight that it is, de facto, null, for the consuming device.

An advantageous variant is distinguished by the fact that a load regulator, to which a signal related to the output current is fed, is provided for the control of the load element. Thus, the load element may also be used as a connected base load during idling. It can also be advantageous if the load regulator is fed a signal related to the current by the load element.

An additional improvement of the switching or regulation behavior can be achieved if the short-circuit-like condition of the control circuit triggered by the stop signal is fed the deviation between the auxiliary voltage and a reference voltage as a regulating signal.

In practice, it is expedient for the load element to be a controllable semiconductor, in particular a transistor.

In many cases the circuit cost can be reduced if the load element can be connected to the output voltage using a switch controlled by the stop signal. It is particularly advantageous if the controlled switch is a relay. Then, the load element can also have a connectable resistor.

Figure 2:
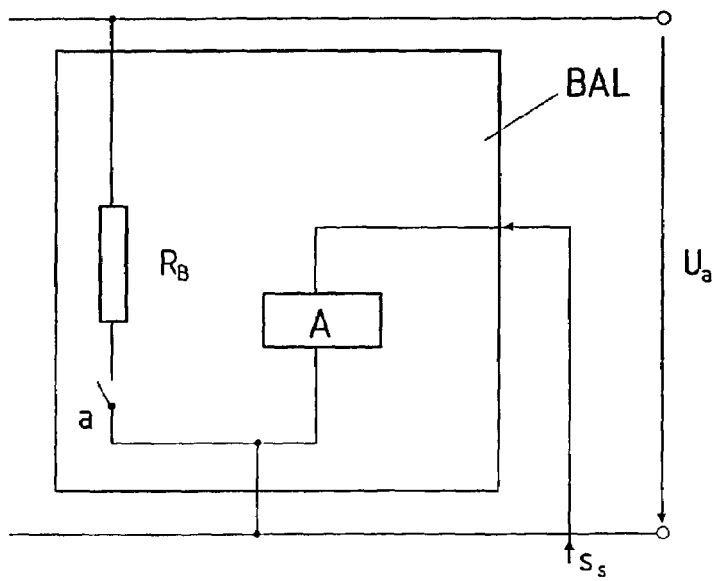
Figure 3:
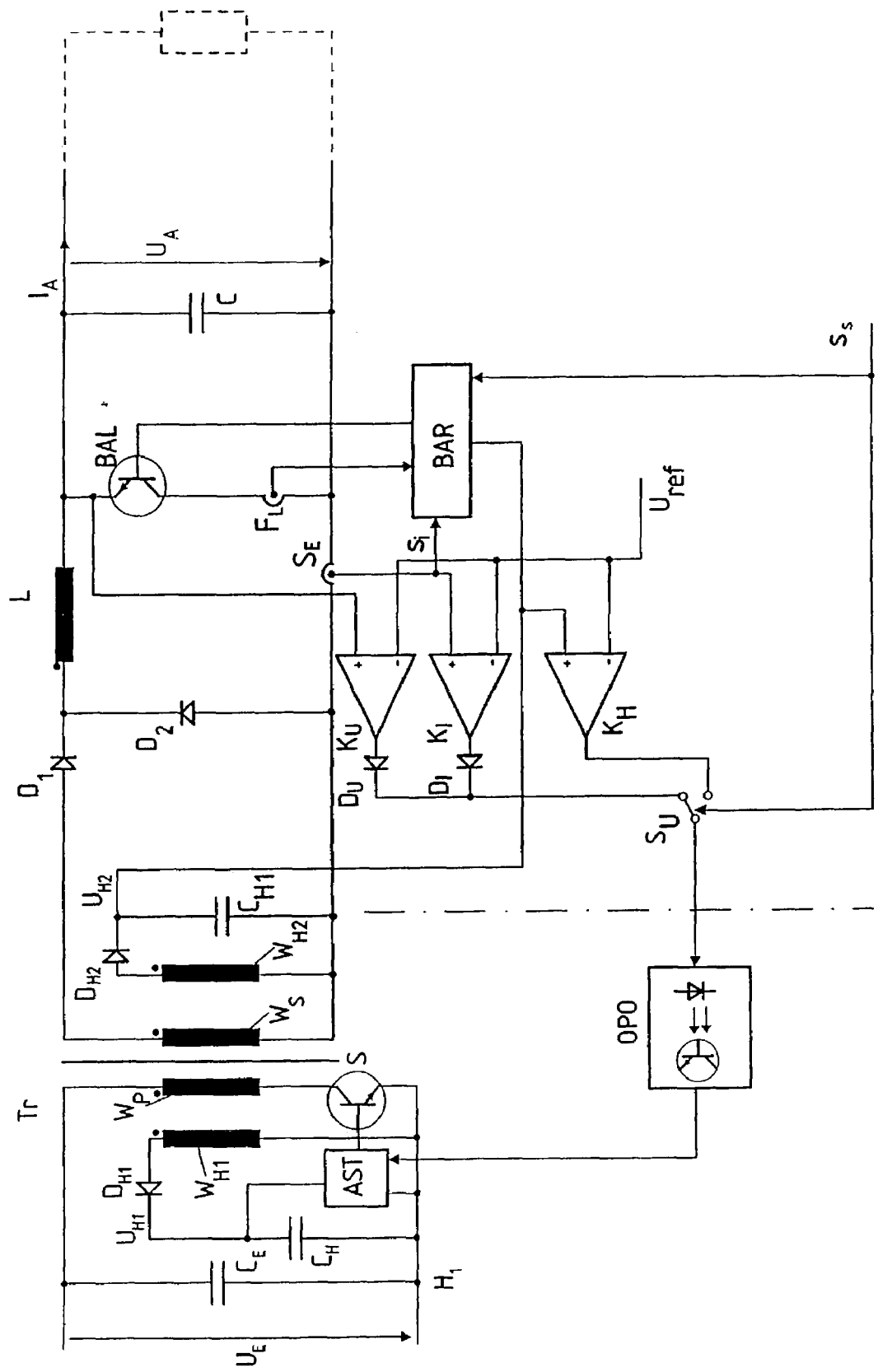

The invention along with additional advantages is explained in detail in the following with reference to exemplary embodiments illustrated in the drawings. They depict:

FIG. 1 a simplified schematic diagram of a switching converter according to the invention, FIG. 2 a possible, simple implementation of a controllable load element, and FIG. 3 a variant of a switching converter according to the invention, depicted in detail.

According to FIG. 1, a switching converter according to the invention has a transformer Tr with a primary winding $W_P$, a secondary winding $W_S$, as well as an auxiliary winding $W_H$. The primary winding $W_P$ can be connected via a controlled circuit S to an input direct current $U_E$, that is obtained, for example, by rectification of power grid voltage. The circuit S is controlled by a control circuit AST that delivers a substantially square control signal $s_0$, via whose pulse duty factor regulation may occur, in particular of the output voltage and/or the output current.

On the secondary side, the voltage of a secondary winding $W_S$ is rectified using a diode D1 and fed via an inductor L to a capacitor C, to which the output direct current $U_a$ is applied. In known fashion, a freewheeling diode D2 is provided. For the regulation of the output voltage $U_a$, it—or a fraction thereof—is compared in a voltage comparator $K_U$ with a reference voltage $U_{R1}$, and the output signal of the voltage comparator $K_U$ is fed to the control circuit AST. Similarly, for the regulation or limiting of the output current $I_a$, the signal of a current sensor $S_c$, e.g., of a current converter or a multiplier, is compared in a current comparator $K_I$ with a reference voltage $U_{R2}$, and the output signal of the current comparator $K_I$ is also fed to the control circuit AST.

In the exemplary embodiments depicted here, the switching converter is implemented as a flow converter; it is, however, emphasized that the invention described in further detail in the following is also applicable in conjunction with blocking converters.

In parallel to the output voltage $U_a$, a load element BAL, to which an external stop signal $s_s$ can be fed, is provided. This will be discussed in further detail below.

An auxiliary voltage $U_H$ is obtained from an auxiliary winding $W_H$ of the transformer Tr by rectification using a diode $D_H$ and filtration through a capacitor $C_H$. More expensive and regulated circuits are, however, usually used to generate an auxiliary voltage. The auxiliary voltage $U_H$, which is potentially separated both from the input voltage $U_E$ and from the output voltage $U_a$, can be used to supply the regulation and control electronics of the switching converter or also for other purposes.

As already explained above, the converter or its output voltage $U_a$ is, de facto, de-energized by the stop signal; however, the auxiliary voltage should be high enough to fulfill the purpose provided for it, e.g., all control and regulation of the converter during operation. For this purpose, the controllable load element BAL is used, which is supposed to generate, upon application of the stop signal, a high enough load on the output of the switching converter that the output voltage $U_a$ is, de facto, null, that the pulse duty factor provided by the control circuit AST still remains high enough that the AC voltage on the auxiliary winding $W_H$ and, thus, also the auxiliary DC voltage $U_H$ remains high enough.

FIG. 2 depicts a very simple possible embodiment, according to which the load element BAL consists of a load resistor $R_B$, that can be applied via a relay switch a to the output of the switching converter. The stop signal $S_s$ is, in this case, supplied to a relay coil A of the relay. In the presence of a stop signal and the corresponding closing of the contact a, the switching converter is, de facto, changed to a short-circuit condition, whereby the output current $I_a$ is adjusted to a maximum value. For this, the output current $I_a$ is measured by a current sensor $S_c$ and compared in the current comparator $K_I$ with a reference voltage $U_{R2}$, which specifies the maximum current. The output signal of the comparator $K_I$ is fed to the control circuit AST, which, in the now existing quasi short-circuit condition switches from voltage regulation via the comparator $K_U$ to current regulation in known fashion. This ensures that the output voltage is, in fact, very low—depending on the magnitude of the load resistance $R_B$, on the order of a few hundred mV—however, a pulse duty factor that ensures an adequately high auxiliary voltage $U_H$ is retained.

In the second embodiment of the invention depicted in greater detail in FIG. 3, the following details must also be mentioned in addition to the circuit elements already enumerated in FIG. 1.

The input voltage $U_E$ applied to an input capacitor $C_E$ is fed to the primary winding $W_P$ via a controlled switch S, depicted here as a transistor; and the associated control circuit AST is supplied by an auxiliary voltage $U_{H1}$, which is obtained by rectification of the voltage applied to an auxiliary winding $W_{H1}$ by a diode $D_{H1}$ and filtration through a capacitor $C_{H1}$.

On the secondary side, the load element BAL is designed as a transistor which lies with its collector-emitter section parallel to the output capacitor C. For the control of the load element BAL, i.e., the transistor, a load regulator BAR is provided, which is, for example, supplied by a second auxiliary voltage $U_{H2}$. This auxiliary voltage $U_{H2}$ is obtained by rectification of the voltage on an auxiliary winding $W_{H2}$ by a diode $D_{H2}$ and subsequent filtration through a capacitor $C_{H2}$.

As according to FIG. 1, here again, a voltage comparator $K_U$ as well as a current comparator $K_I$ is provided, whereby the outputs of these two comparators $K_U$ and $K_I$ are fed by decoupling diodes $D_U$ and $D_I$ via a changeover switch $S_U$ and an optical coupler OPO to the control circuit AST.

Provision is made in this variant that upon appearance of the stop signal $s_s$, adjustment to the auxiliary voltage $U_{H2}$ occurs. In addition, the current is measured by the transistor of the load element BAL with a current sensor $F_c$ and fed to the load regulator BAR, such that the current is also taken into account by the load element.

For regulation to the auxiliary voltage $U_{H2}$, an additional comparator $K_H$ is provided, to one of whose inputs the auxiliary voltage $U_{H2}$ or a fraction thereof is supplied, whereas a reference voltage $U_{ref}$ is supplied to the other input of this comparator—just as to the other respective inputs of the comparators $K_U$ and $K_I$.

Using the changeover switch $S_U$ controlled by the stop signal $S_s$, the regulation of the voltage or current via the comparators $K_U$ and $K_I$ can be switched to the regulation to the auxiliary voltage $U_{H2}$ via the comparator $K_H$.

When, with this circuit, a stop signal $S_s$ is supplied, for example, from a remote consuming device, the entire regulation switches via the changeover switch $S_U$ to the regulation of the auxiliary voltage $U_{H2}$—and, of course, also of $U_{H1}$ because of the magnetic coupling. A current flows via the transistor of the load element BAL, by which the current sensor $F_E$ is limited using the load regulator BAR. In addition, via a signal $S_i$ from the current sensor $S_c$, a freewheeling state can be detected, whereby the load element BAL is then connected via the load regulator BAR to a base load.

In this variant of the invention as well, it is essential that a short-circuit-like condition be introduced via the controllable load element BAL as soon as a stop signal appears. The load element, in this case, the transistor on the output, is set such that the output voltage is adequately low (de facto, null, for the respective consuming device), and that, on the other hand, the current through the load element is only just large enough that the auxiliary supply voltages are adequately high.

It should be pointed out that combinational circuit parts often have more than one output voltage, i.e., two or more decoupled DC output voltages, of which at least one is regulated. The load element in the context of the invention may then lie on one of the output voltages since the other output voltages are coupled by the magnetic circuit.

The invention claimed is:

1. A switching converter to convert an input direct current into at least one output direct current comprising:
    a controlled switch;
    a primary winding to accept via the controlled switch the input direct current;
    a control circuit for feeding a control signal with a variable pulse duty factor to the controlled switch and for regulating the switching converter depending on a secondary current or voltage, or a primary current or voltage, by changing at least the pulse duty factor of the control signal;
    at least one auxiliary winding from which an internal auxiliary voltage is derived; and
    a controllable load element controlled by a stop signal for electrically coupling and decoupling the controllable load element to and from an output voltage,
    wherein when electrically coupled to the output voltage, the controllable load element maintains the pulse duty factor of the control signal sufficient for generating the internal auxiliary voltage required for operating the switching converter.

2. The switching converter of claim 1, further comprising a load regulator, to which a signal related to the output current is supplied, for controlling the controllable load element.

3. The switching converter of claim 2, wherein a signal related to a current through the controllable load element is supplied to the load regulator.

4. The switching converter of claims 1 or 2 or 3, wherein the deviation between the auxiliary voltage and a reference voltage is fed as a control signal in the short-circuit-like condition of the control circuit triggered by the stop signal.

5. The switching converter of claim 1, wherein the controllable load element is a controllable semiconductor.

6. The switching converter of claim 5, wherein the controllable load element is a transistor.

7. The switching converter of claim 1, wherein the controllable load element can be connected to the output voltage using a switch controlled by the stop signal.

8. The switching converter of claim 7, wherein the controlled switch is a relay.

9. The switching converter of claims 7 or 8, wherein the controllable load element has a connectable resistor.

10. A switching converter for converting an input direct current into an output direct current, comprising:
    a controlled switch controlled by varying a pulse duty factor of a control signal;
    a primary winding coupled via the controlled switch to the input direct current;
    a control circuit for feeding the control signal having the variable pulse duty factor to the controlled switch;
    an auxiliary winding for producing an internal auxiliary voltage for operating the switching converter;
    a secondary winding for producing the output direct current and an output voltage; and
    a controllable load element electrically coupled to the output voltage by a stop signal for lowering the output voltage while maintaining the internal auxiliary voltage sufficient for operating the switching converter.

* * * * *